United States Patent

Barg

Patent Number: 5,853,216
Date of Patent: Dec. 29, 1998

[54] AIR SHIELD

[76] Inventor: James A. Barg, 2292 Ochard Crest Bldg. 18, Utica, Mich. 48317

[21] Appl. No.: 611,200

[22] Filed: Mar. 5, 1996

[51] Int. Cl.$^6$ .............................. B62J 15/00; B62D 35/00
[52] U.S. Cl. ......................................... 296/78.1; 296/180.1
[58] Field of Search ................................. 296/77.1, 78.1, 296/180.1; 180/68.1; 280/152.1–152.3, 852; D12/181–186

[56] References Cited

U.S. PATENT DOCUMENTS

| | | | |
|---|---|---|---|
| D. 135,493 | 4/1943 | Blide | D12/186 |
| D. 281,875 | 12/1985 | Stahel | D12/182 |
| 4,198,093 | 4/1980 | Muth et al. | D12/182 X |
| 4,620,713 | 11/1986 | Sakaguchi | 280/152.3 |
| 4,822,067 | 4/1989 | Matsuo et al. | 296/180.1 X |
| 4,982,973 | 1/1991 | Saito et al. | 280/152.1 |

FOREIGN PATENT DOCUMENTS 846420  8/1960  United Kingdom ................. 296/78.1

*Primary Examiner*—Dennis H. Pedder

[57] ABSTRACT

An attachment securely mounted to the front fender of a fairinged motorcycle which will reduce the amount of air entering the fairing at any given speed. This device will reduce the aerodynamic drag on the motorcycle which in turn will allow a higher top speed in addition to increasing stability at speed.

1 Claim, 5 Drawing Sheets

PERSPECTIVE

AIR SHIELD

REFERENCES CITED

REFERENCES CITED

U.S. Patent Documents

| | | |
|---|---|---|
| D 170,784 | 11/1952 | West Jr. |
| D 3,462,188 | 8/1969 | Edgar |
| D 294,131 | 2/1988 | Stahel |
| D 341,343 | 11/1993 | Netz |
| D 5,314,207 | 5/1994 | Camfield et al |

SUMMARY OF THE INVENTION

The air shield is an attachment which is fitted to the front fender of a fairinged motorcycle. It is designed to fit on top, center, and foremost front of the fender, to which it can be securely fastened with either rivets or bolts. The device will not contact the nose of the motorcycle during full front fork travel or full steering movements.

This device is designed to reduce the aerodynamic drag of the fairinged motorcycle while it is at speed. The air shield will allow a higher top speed to be achieved while offering greater stability.

DETAIL DESCRIPTION OF THE INVENTION

Figure 1:
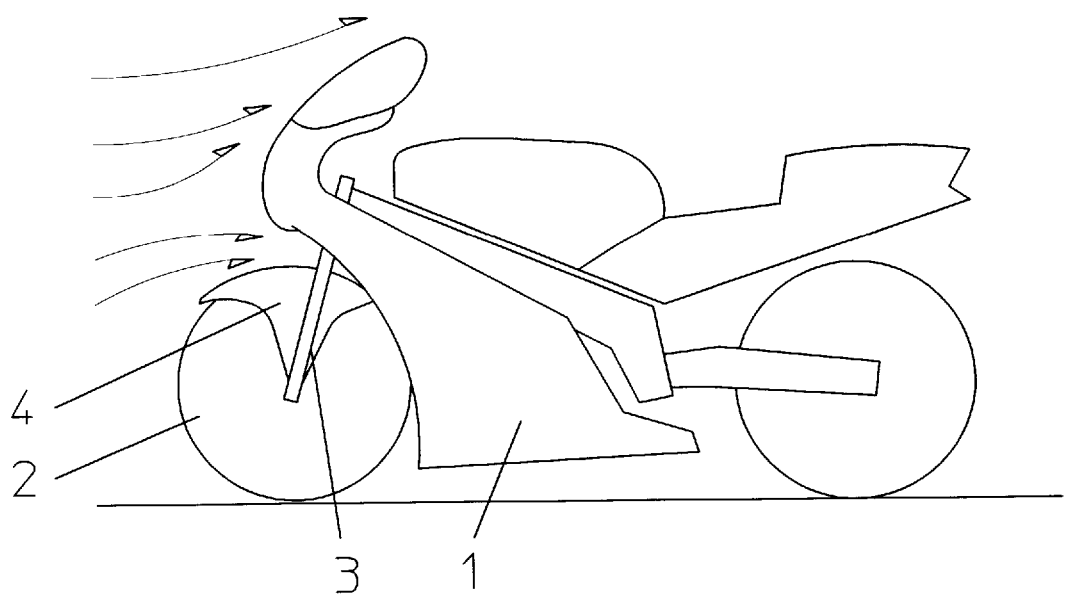
FIG. 1. is a drawing of a motorcycle showing the fairing (1), front wheel (2), front forks (3), and the front fender (4), showing the path of the air flow approaching a fairinged motorcycle without an airshield.
Figure 2:
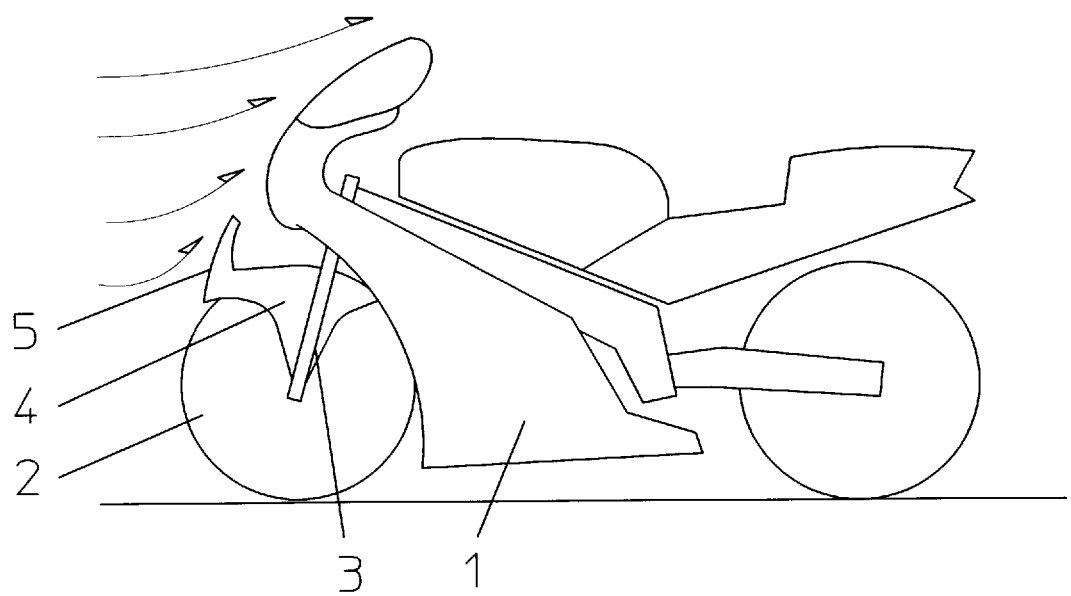
FIG. 2. is a drawing of a motorcycle showing the path of the air flow approaching a fairinged motorcycle without an airshield installed.
Figure 3:
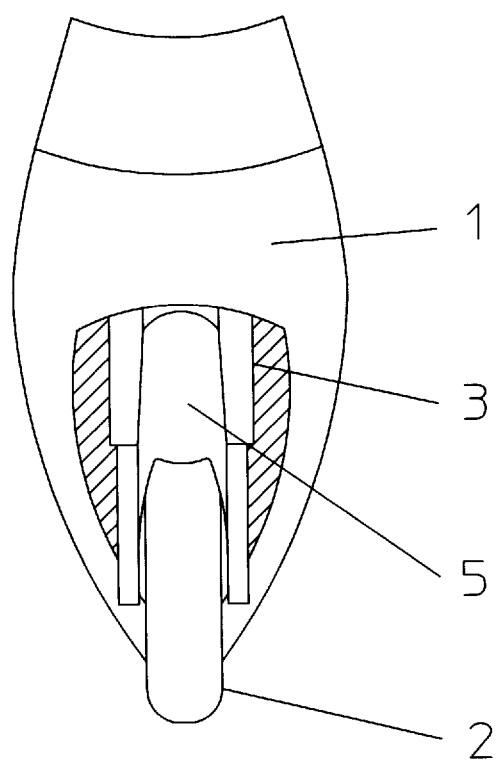
FIG. 3. is a front view of a fairinged motorcycle, with an airshield, showing the area that is open to air flow (shown in black).
Figure 4:
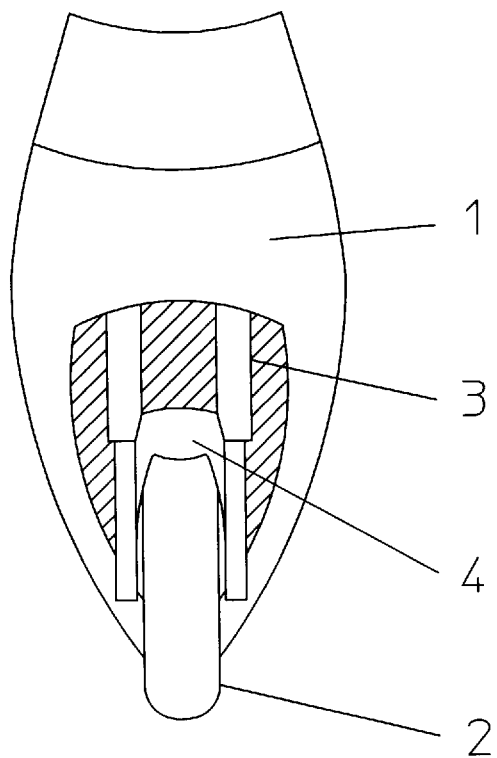
FIG. 4. is a front view of a fairinged motorcycle, without an airshield, showing the area that is open to air flow (shown in black).
Figure 5:
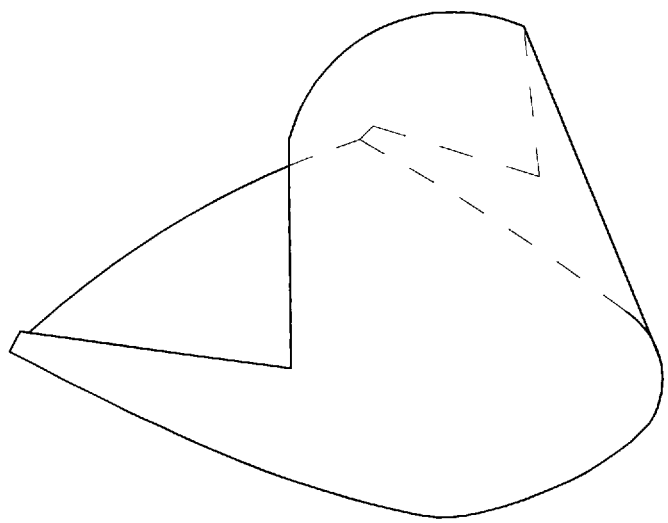
FIG. 5. shows a perspective of the airshield.

This description will refer to the FIGS. 1–5. The air-shield is fabricated from two separate pieces which are molded together to form one complete unit. The two pieces are the shield and the palette. As seen in FIG. 5, the vertical curve is the actual "shield" and the horizontal curve is the mounting piece called the "palette". The palette is molded to conform to the same shape as the motorcycle's front fender.

The shield is adhered to the palette with epoxy and is the actual section that performs the aerodynamic functions as described in the Claims. The complete unit is then mounted to the motorcycles front fender through the use of screws, bolts, or rivets. Due to differences between makes and models of motorcycles intended for use, individual placement of fasteners is governed by the physical limits of the motorcycle itself. A minimum of three fasteners is recommended, but more may be used. Actual placement of the air-shield will again depend on the physical shape of the motorcycle. The device will be mounted on the top center and foremost front of the front fender and will not interfere with full front fork travel and steering movements as seen in FIG. 5.

The air-shield is a simple design so a number of different materials may be used effectively, such as plastic, carbon fiber, or fiberglass.

I claim:

1. An aerodynamic deflector for placement upon a motorcycle front fender, the motorcycle having front forks separated by a first lateral distance and a fairing partially enclosing the motorcycle, said motorcycle defining an area in frontal view bounded by said front fender, said front forks, and an upper surface of a fairing opening containing the front forks, the shield comprising:

a lower palette shaped to conform to an upper surface of said front fender;

a shield portion upstanding from the palette and having an upper edge, and side edges being spaced apart substantially said first lateral distance, and when the palette is installed upon the front fender the upper edge extending to a height substantially equal to a height of said upper surface of the fairing opening, wherein the deflector when installed acts to reduce both aerodynamic drag and lift.

* * * * *